US012666338B2

(12) United States Patent
Tseng et al.

(10) Patent No.: US 12,666,338 B2
(45) Date of Patent: Jun. 23, 2026

(54) MULTI-LINK DEVICE AND CONTROL METHOD THEREOF

(71) Applicant: Realtek Semiconductor Corp., HsinChu (TW)

(72) Inventors: Chun-Kai Tseng, HsinChu (TW); Ya-Xin Dai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 268 days.

(21) Appl. No.: 18/408,604

(22) Filed: Jan. 10, 2024

(65) Prior Publication Data

US 2024/0365209 A1     Oct. 31, 2024

(30) Foreign Application Priority Data

Apr. 26, 2023    (TW) ................................. 112115553

(51) Int. Cl.
H04W 40/24         (2009.01)
H04W 24/04         (2009.01)
H04W 24/10         (2009.01)

(52) U.S. Cl.
CPC ........... H04W 40/24 (2013.01); H04W 24/04 (2013.01); H04W 24/10 (2013.01)

(58) Field of Classification Search
CPC ..... H04W 84/12; H04W 76/15; H04W 88/08; H04W 74/0816; H04W 88/06; H04W 80/02; H04W 28/0268; H04L 1/0002; H04L 1/0041; H04L 5/0064; H04L 1/0009; H04L 1/1854
See application file for complete search history.

(56) References Cited

U.S. PATENT DOCUMENTS

| 2006/0083165 | A1* | 4/2006 | McLane ................. | H04L 43/50 |
| | | | | 370/229 |
| 2016/0192214 | A1* | 6/2016 | Yu ......................... | H04W 76/18 |
| | | | | 370/228 |
| 2021/0076249 | A1* | 3/2021 | Hsu .................... | H04W 28/0236 |
| 2021/0212062 | A1* | 7/2021 | Kurian .................... | H04W 4/80 |
| 2022/0337338 | A1 | 10/2022 | Homchaudhuri | |
| 2022/0377338 | A1* | 11/2022 | Bossen ................. | H04N 19/70 |

(Continued)

FOREIGN PATENT DOCUMENTS

CN         115348610 A     11/2022

*Primary Examiner* — Kharye Pope
(74) *Attorney, Agent, or Firm* — Winston Hsu

(57)          ABSTRACT

A multi-link device includes a link information collecting module, a decision module, a control module, and a transceiver module. The link information collecting module collects wireless environment information and packet transmission information for each channel in the M channels, generates a set of feature scores of each channel, and outputs M sets of feature scores of the M channels. The decision module generates a latency score according to data transmission requirements of a data transmission, if the latency score exceeds a latency threshold, determines whether there are 2 channels satisfying a latency criterion according to the M sets of feature scores of the M channels, and outputs a decision report according to whether there are 2 channels satisfying the latency criterion. The control module configures the transceiver module according to the decision module. The transceiver module performs the data transmission.

20 Claims, 5 Drawing Sheets

(56) References Cited

U.S. PATENT DOCUMENTS

| | | | |
|---|---|---|---|
| 2023/0232452 A1* | 7/2023 | Li | H04W 74/002 |
| | | | 370/329 |
| 2024/0057184 A1* | 2/2024 | Ratnam | H04W 76/15 |
| 2024/0365419 A1* | 10/2024 | Jia | H04W 76/15 |

* cited by examiner

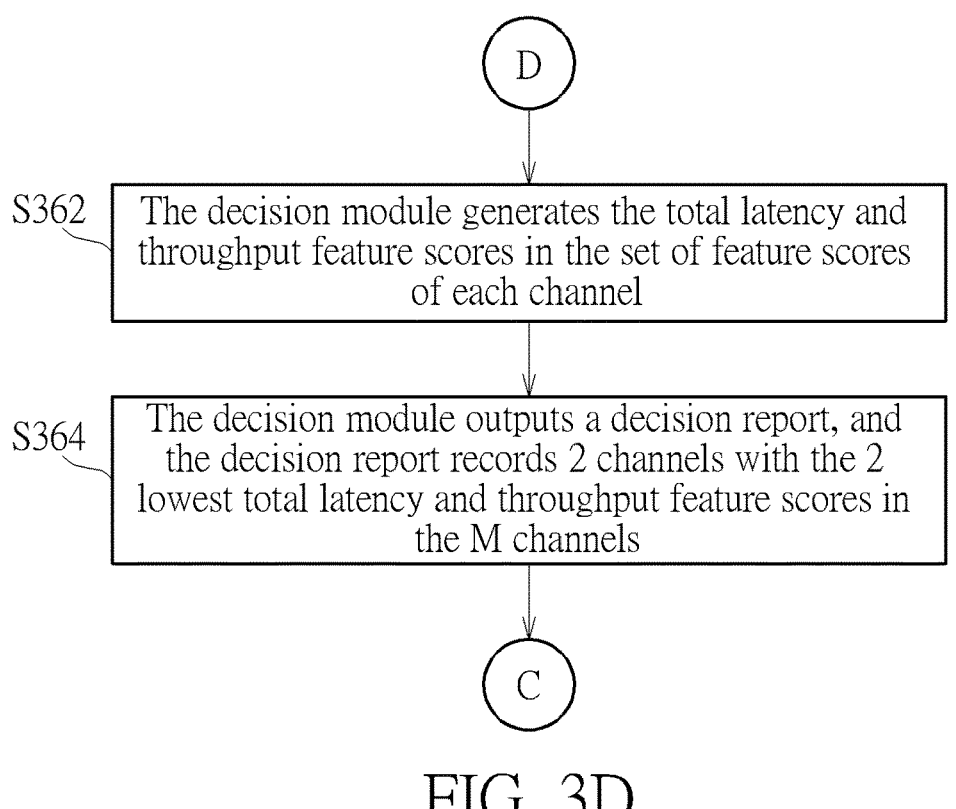

S362    The decision module generates the total latency and throughput feature scores in the set of feature scores of each channel S364    The decision module outputs a decision report, and the decision report records 2 channels with the 2 lowest total latency and throughput feature scores in the M channels

FIG. 3D

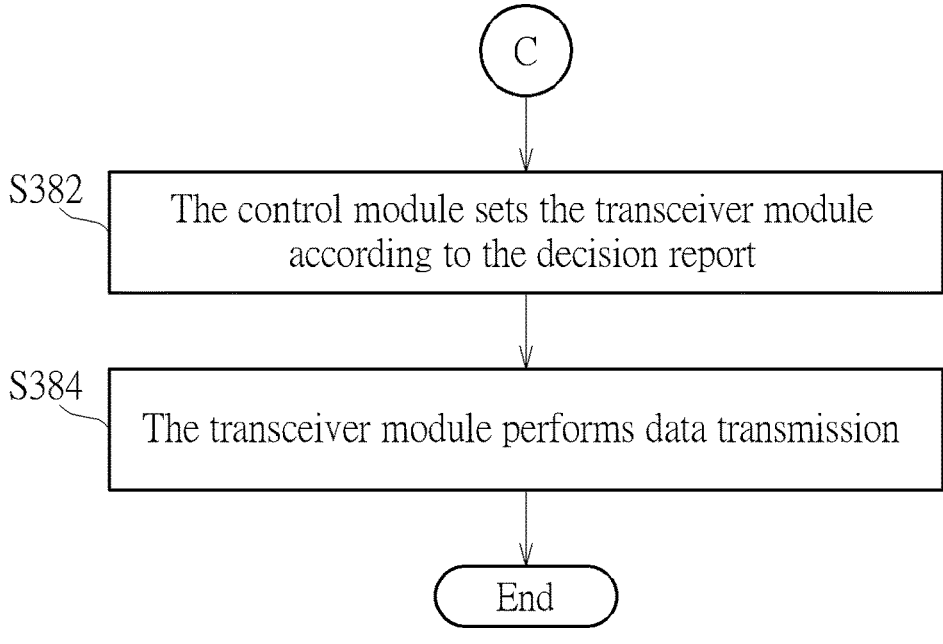

S382    The control module sets the transceiver module according to the decision report S384    The transceiver module performs data transmission End

FIG. 3E

MULTI-LINK DEVICE AND CONTROL METHOD THEREOF

BACKGROUND OF THE INVENTION

1. Field of the Invention

The present invention relates to wireless communication, and in particular, to a multi-link device and a control method thereof.

2. Description of the Prior Art

The IEEE 802.11be communication protocol is a new generation of Wi-Fi 7 wireless access technology that supports multi-link operation (MLO). In MLO, an access point multi-link device (AP MLD) and a non-access point multi-link device (non-AP MLD) identify a plurality of links commonly used by the two, and use one or more links to transmit packets during uplink (UL) or downlink (DL) transmissions.

In the current wireless environment, due to the continuous growth of users on Wi-Fi channels, a great amount of coverage of access points overlaps, reducing the average time and spectral resources allocated to each Wi-Fi device, increasing collisions between transmitted packets and other packets in the Wi-Fi channel, resulting in frequent packet retransmissions and wasting spectral resources and time.

SUMMARY OF THE INVENTION

An embodiment of the present invention provides a multi-link device. The multi-link device comprises a link information module, a decision module, a transceiver module and a control module. The link information module is configured to collect wireless environment information and packet transmission information of each channel of M channels supported by the multi-link device, and generate a set of feature scores of the each channel according to the wireless environment information and/or the packet transmission information, and output M sets of feature scores of the M channels, wherein M is a positive integer greater than or equal to 2. The decision module is coupled to the link information module, and configured to receive a data transmission requirement of a data transmission and the M sets of feature scores of the M channels, generate a latency score according to the data transmission requirement, determine whether at least 2 channels of the M channels meet a latency criterion according to the M sets of feature score of the M channels if the latency score is greater than a latency threshold, and generate a decision report at least according to whether at least 2 channels of M channels meet the latency criterion. The transceiver module is configured to transmit the information. The control module is coupled to the decision module and the transceiver module, and configured to set up the transceiver module according to the decision report.

Another embodiment of present invention provides a method for controlling a multi-link device. The multi-link device comprises a link information module, a decision module, a control module and a transceiver module. The method comprises the link information module collecting wireless environment information and packet transmission information of each channel of M channels supported by the multi-link device, wherein M is a positive integer greater than or equal to 2, the link information module generating a set of feature scores of the each channel according to the wireless environment information and/or the packet transmission information, the link information module outputting the M sets of feature scores of the M channels, the decision module receiving a data transmission requirement of a data transmission and the M sets of feature scores of the M channels, the decision module generating a latency score according to the data transmission requirement, the decision module determining whether at least 2 of the M channels meet a latency criterion according to the M sets of feature scores of the M channels if the latency score is greater than a latency threshold, the decision module outputting a decision report according to at least whether at least 2 of the M channels meet the latency criterion, the control module setting the transceiver module according to the decision report, and the transceiver module performing the data transmission.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 3A to 3E are flowcharts of a method for controlling the multi-link device in FIG. 2.

DETAILED DESCRIPTION

Figure 1:
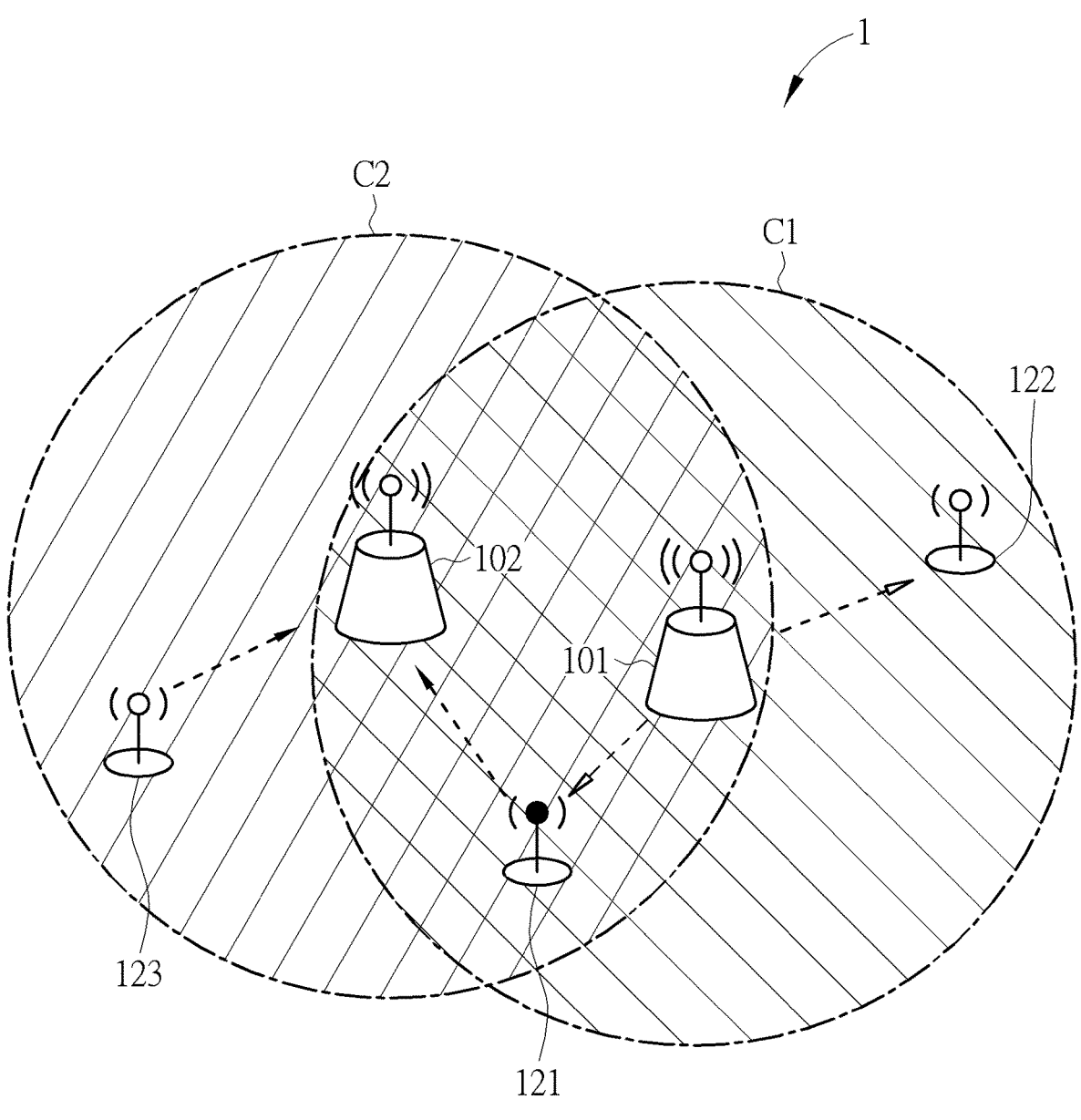
FIG. 1 is a schematic diagram of a multi-link communication system according to an embodiment of the present invention.

FIG. 1 is a schematic diagram of a multi-link (MLD) communication system 1 according to an embodiment of the present invention. The multi-link communication system 1 may support IEEE 802.11 standard, e.g. IEEE 802.11BE standard, to realize multi-link operation (MLO). The multi-link communication system 1 may include access points 101 and 102, and stations 121 to 123. The access point 102, the station 121 and the station 123 may form a basic service set (BSS) C2, and the access point 101 and the station 122 may form another BSS C1. The BSS C1 and the BSS C2 may partially overlap, therefore, the BSSs C1 and C2 may be referred to as an overlapping basic service set (OBSS). For a wireless network (Wi-Fi) frame exchange between the access point 102 and the station 121, the BSS C2 may also be referred to as an intra-basic service set (intra-BSS), and the BSS C1 may also be referred to as an inter-basic service set (inter-BSS). If all the devices in the OBSS are running on the same channel, the station 123 in intra-BSS C2 may compete with the station 121 for transmission opportunities, and the access point 101 and the station 123 in inter-BSS C1 may generate signal interference to or occupy the available spectral resource of the station 121, resulting in packet collisions and retransmission. Thus, the station 121 may choose an appropriate channel to avoid competition with the station 123 and reduce the signal Interference from the station 122, thereby reducing packet collision and retransmission.

The access point 102 may be an access point multi-link device (AP MLD), and the station 121 may be a non-access point multi-link device (non-AP MLD). Both the access point 102 and the station 121 may support a plurality of bands and may perform multi-link transmission. For example, the access point 102 may support 2.4G band, 5G band and 6G band; the station 121 may support 2.4G band and 5G band; the station 121 may select channel 1 from the 2.4G band as a first link and select channel 36 from the 5G band as a second link; and the access point 102 may perform transmission via the first link and the second link. Under an establishment of an association, the access point 102 and the station 121 may negotiate to determine the channel and modulation and coding scheme (MCS) to be used. After an association is established, the multi-link device may dynamically adjust the channels without disconnection and reconnection, and utilize the spectral resource effectively and improve user experience at the same time. For example, the station 121 may otherwise select channel 40 with a better connection condition from the 5G band as the second link, and perform a multi-link reset to notify the access point 102 to switch the second link to channel 40.

The access point 102 or the station 121 may evaluate the MLO capability of all the available channels regularly, and select at least 2 channels from all the available channels that meet the data transmission requirement according to the MLO capability evaluation results of all the available channels. If at least 2 channels are successfully selected, the access point 102 or the station 121 may perform data transmission via the selected at least 2 channels. If unable to successfully select at least two channels, then the access point 102 or the station 121 is not suitable for MLO, and the access point 102 or the station 121 may select the best channel that meets the data transmission requirement, and perform single link operation (SLO) via the selected best channel. Therefore, the access point 102 or the station 121 may actively select a channel with a better connection condition for transmission immediately, whereby enhancing the spectral and time resource usage effectiveness, and reducing power waste due to the packet collision and retransmission.

Figure 2:
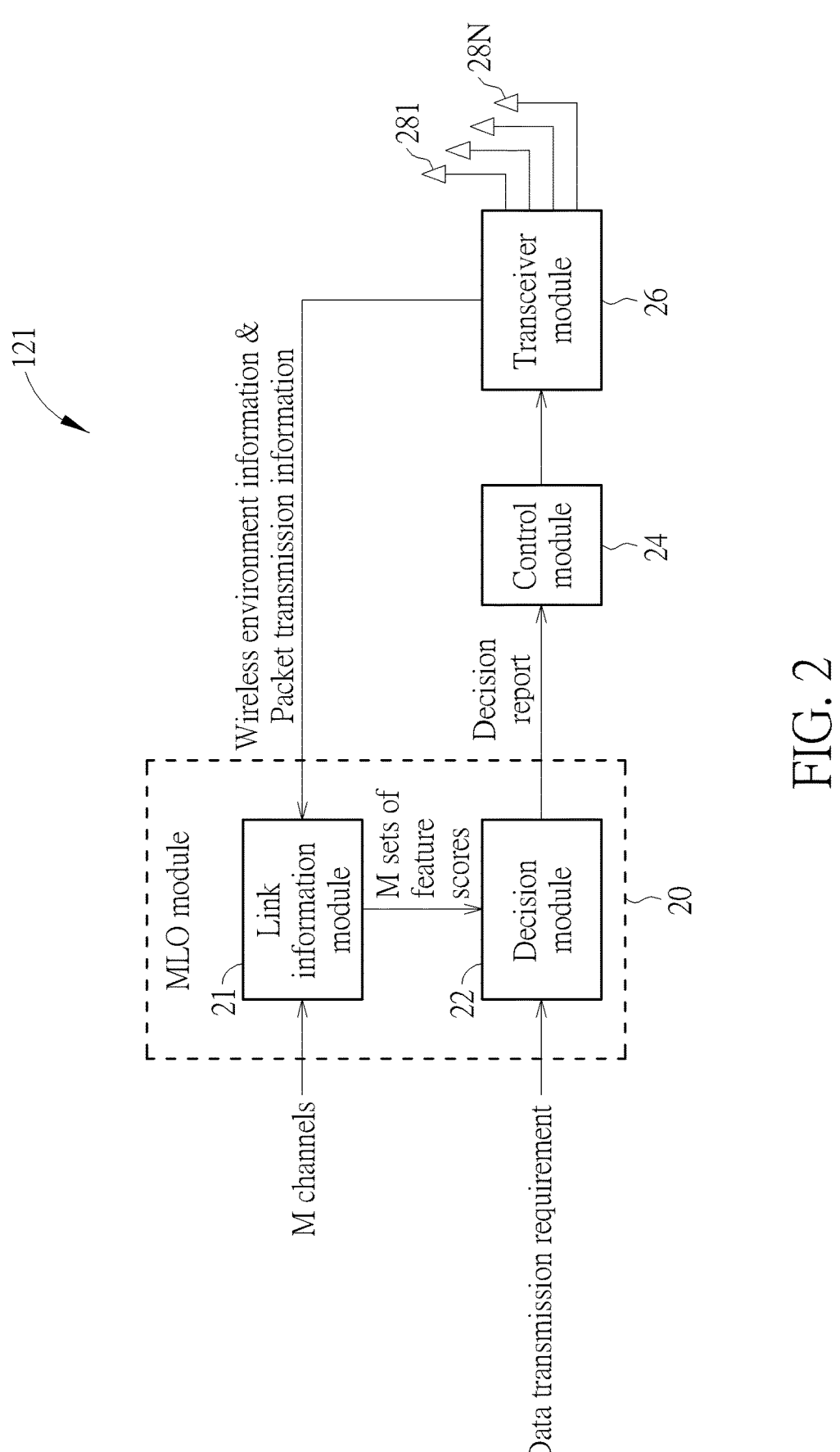
FIG. 2 is a block diagram of a multi-link device according to an embodiment of the present invention.
Figure 3A:
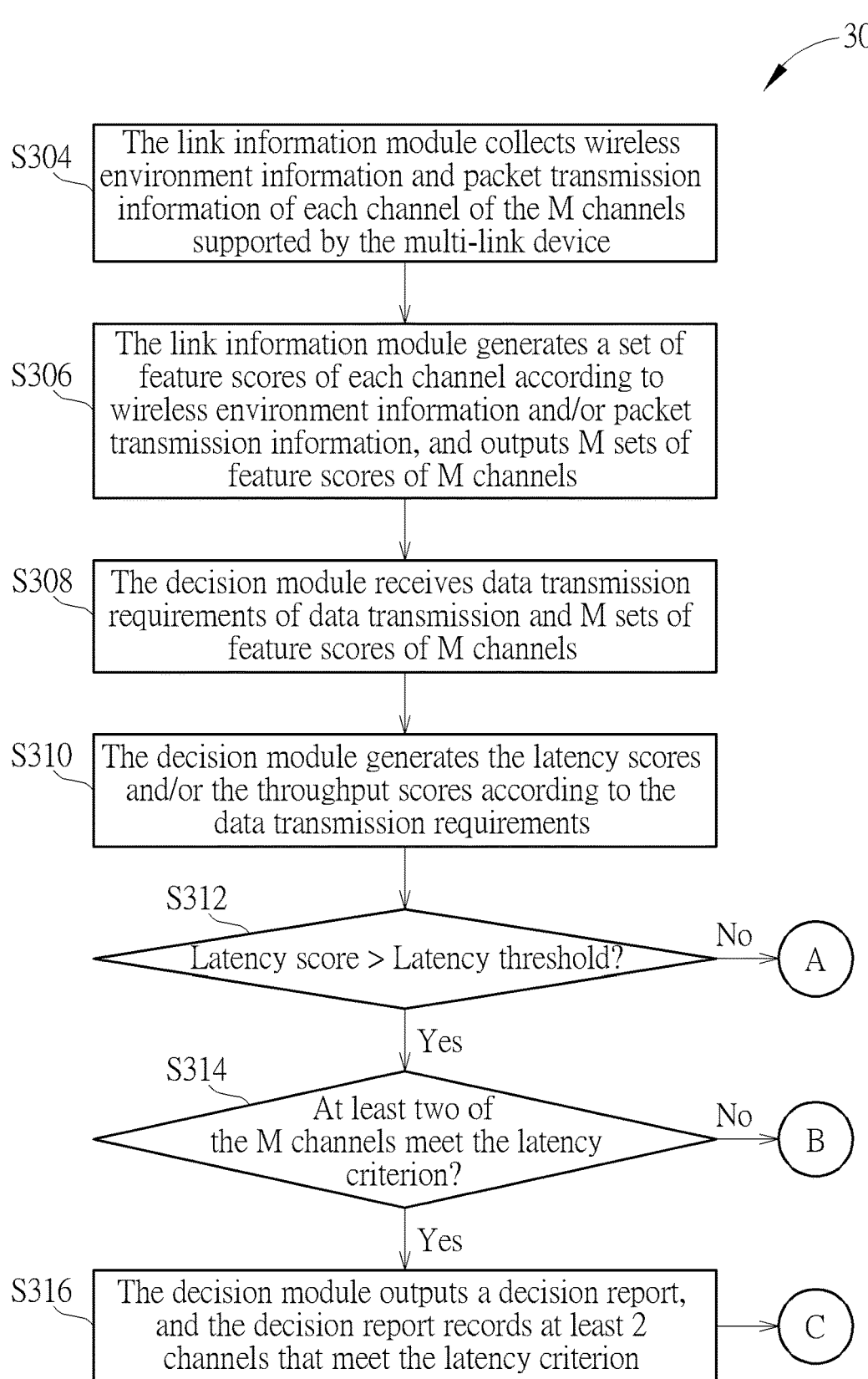
Figures 3B, 3C:
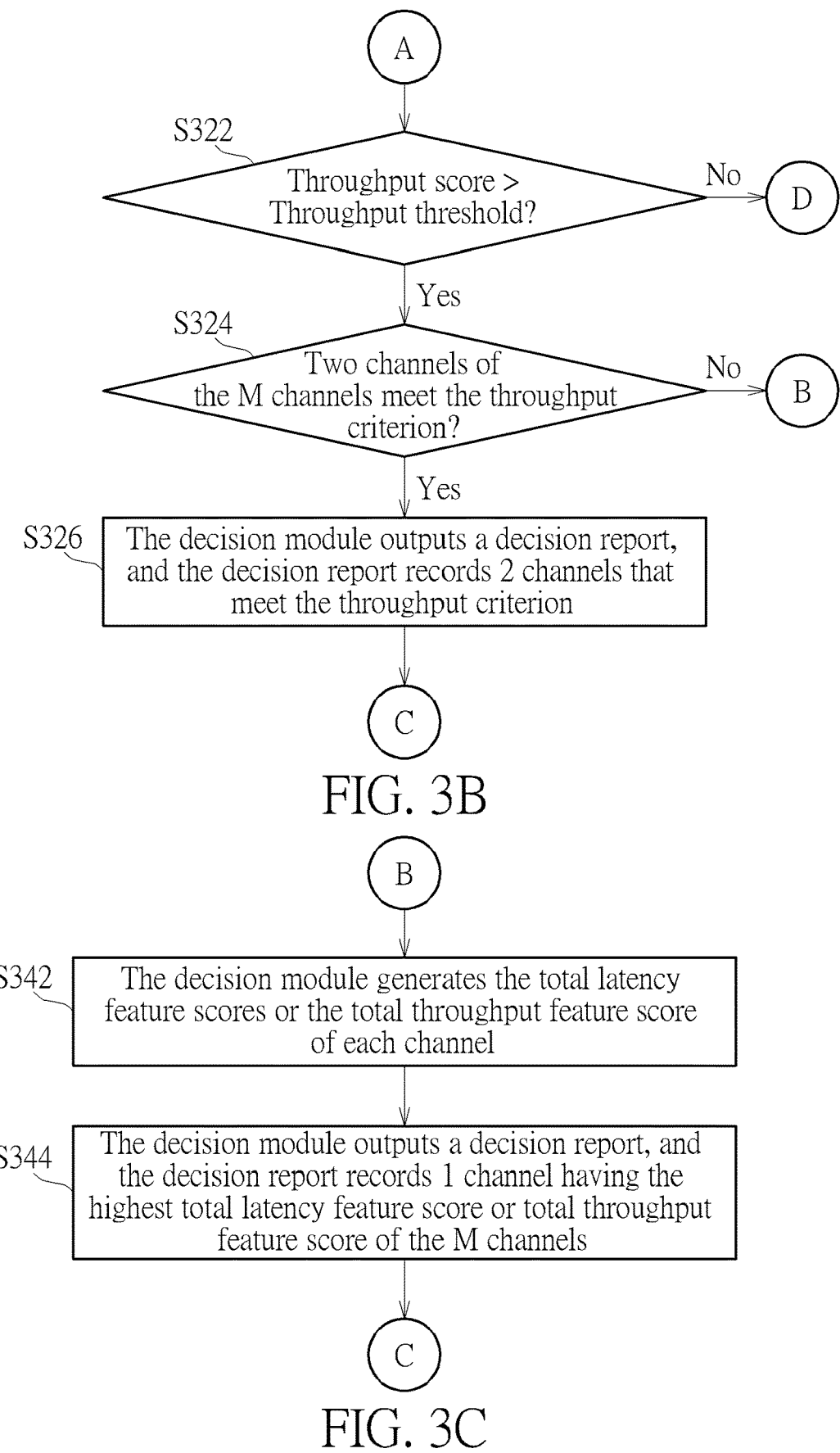

FIG. 2 is a block diagram of a multi-link device according to an embodiment of the present invention. The multi-link device may be the access point 102 and/or the station 121. The following paragraphs are exemplified by the station 121 in detail. The station 121 may include an MLO module 20, a control module 24, a transceiver module 26 and antennas 281 to 28N, wherein N is a positive integer greater than or equal to 2. The MLO module 20 may include a link information module 21 and a decision module 22. The link information module 21 may be coupled to the decision module 22; the decision module 22 may be coupled to the control module 24; the control module 24 may be coupled to the transceiver module 26; and the transceiver module 26 may be coupled to the antennas 281 to 28N and the link information module 21.

The decision module 22 may generate a decision report, and the decision report includes one or more channels recommended to be configured by the transceiver module 26. Under an establishment of an association, the station 121 may declare M channels supporting MLO, and the link information module 21 may record the M channels, wherein M is a positive integer greater than or equal to 2. For example, if the station 121 declares that the channels 1 to 14 (14 channels in total) of the 2.4G band and channels 36 to 165 (24 channels in total) of the 5G band support MLO, the link information module 21 may record 38 channels supporting MLO (M=38). The link information module 21 may monitor the M channels to collect the wireless environment information and packet transmission information of each of the M channels continuously.

Wireless environment information may be obtained by monitoring each channel. In some embodiments, the wireless environment information may be obtained by physical carrier sense and/or virtual carrier sense. The physical carrier sense may include clear channel assessment energy detection (CCA-ED) and clear channel assessment signal detection (CCA-SD). The loading of a channel is evaluated via CCA-ED through the energy on the channel, and source of the energy of the CCA-ED is not limited to Wi-Fi transmission. CCA-SD calculates the number of accesses of the channel by other Wi-Fi devices via detecting Wi-Fi preambles on the channel, whereby evaluating the loading of the channel. The source of the energy of the CCA-SD energy is limited to Wi-Fi transmission. Virtual carrier sensing may include using a Network Allocation Vector (NAV) to evaluate the loading of the channel. The NAV can be considered as a countdown counter, located in the MAC header of the medium access control (MAC) packet. When the NAV is detected to have a non-zero value, the link information module 21 may determine that the connection status of the channel is busy; when the NAV is detected to have a zero value, the link information module 21 may determine that the connection status of the channel is idle. In some embodiments, the link information module 21 may detect the length of time during which the NAV is non-zero in a predetermined period of time to evaluate the loading of the channel. The predetermined period of time may be a target beacon transmission time (TBTT) or other fixed period of time. In some embodiments, the link information module 21 may distinguish the NAV of inter-BSS C1 and the NAV of intra-BSS C2 from the MAC header of the MAC packet, thereby detecting if the channels of the inter-BSS C1 and the intra-BSS C2 are being occupied by data accesses respectively.

The packet transmission information may be obtained by monitoring the transmission/reception packets of the station 121 on each channel. In some embodiments, the packet transmission information may include the number of collisions of the transmitted packets, the latency of the transmitted packets, the MCS of the transmitted/received packets, the payload size of the transmitted/received packets, and/or the bandwidth of the transmitted/received packets. The number of collisions of the transmitted packets may be an average number of collisions in a predetermined period. A channel with a smaller average number of collisions is more suitable for latency-oriented packets. The latency of the transmitted packets may be an average latency of the transmitted packets in a predetermined period of time. A channel with a smaller average latency is more suitable for latency-oriented packets. The MCS of the transmitted/received packet may be the MCS of the previous transmitted/received packet. A channel with a higher MCS index indicates a higher transmission rate and better transmission quality of the channel, and is more suitable for throughput-oriented packets. The payload size of the transmitted/received packets may be an average payload size in a predetermined period of time. A channel with a larger average payload size indicates better channel quality and is more suitable for throughput-oriented packets. The bandwidth for transmitted/received packets may be an average actual used bandwidth for transmitted/received packets in a predetermined period of time. A channel with a larger average actual bandwidth means that there are fewer other users on the channel, or the channel may transmit more data, which is suitable for latency-oriented or throughput-oriented packets.

The link information module 21 may generate a set of feature scores of each channel at predetermined intervals according to wireless environment information and/or packet transmission information, and output M sets of feature scores of M channels. The M set of feature scores may be illustrated in a tabular form, as shown in Table 1 below:

TABLE 1

|  | Feature #1 | Feature #2 | . . . | Feature #K |
|---|---|---|---|---|
| Channel #1 | Score | Score | . . . | Score |
| Channel #2 | Score | Score | . . . | Score |
| . . . | . . . | . . . | . . . | . . . |
| Channel #M | Score | Score | . . . | Score |

Referring to Table 1, M channels may be marked as channel #1 to channel #M, and a set of feature scores of each channel may contain K feature scores, corresponding to K features, and K features may be marked as feature #1 to feature #K, K is a positive integer. Each feature score may be generated according to wireless environment information and/or packet transmission information of each channel. The following example illustrates how the feature score is generated.

The link information module 21 may generate feature scores according to the wireless environment information of each channel. For each channel, the receive end (Rx) of the transceiver module 26 may detect the CCA-SD energy of the channel to confirm whether the channel is being occupied for Wi-Fi transmission. If the CCA-SD energy exceeds the predetermined SD threshold, it means that other users user_i are occupying the channel. The link information module 21 may observe the channel for a predetermined period t_total, calculate the time t_i of the channel occupied by each user user_i, divide the time t_i by the predetermined period t_total to calculate the payload of the channel caused by each user user_i (=t_i/t_total), and evaluate the congestion level of the channel accordingly, thereby helping to manage network traffic, reduce collisions, and improve the performance of the entire network. The unit of the payload of the channel may be the percentage of time the channel is used. For example, the predetermined period t_total may be 1024 microseconds (μs), the time t_i occupied by the user user_i may be 102 microseconds, and the payload of the channel of user_i may be 10% (=102/1024). In some embodiments, after the CCA-SD energy exceeds the predetermined SD threshold, the link information module 21 may also use the CCA-SD energy and the CCA-ED energy to calculate the payload of the channel simultaneously to generate the feature scores.

In some embodiments, the link information module 21 may generate the expected value of the payload of the channel of each user user_i (mean) to generate a feature score. The expected payload of the channel may represent the average payload of the channel of the user user_i. The lower the expected value of the payload of the channel, the shorter the time is for the user user_i using the channel, which reduces the probability of collision, reduces the number of packet retransmissions, and reduces the latency. Thus, the expected value of the payload of the channel may be a latency-oriented feature.

In some other embodiments, the link information module 21 may generate the variance of the payload of the channel of each user user_i to generate a feature score. The variance of the payload of the channel may represent the difference of the payload of the channel of the user user_i. The higher the variation of the payload of the channel is, the greater is the time difference of user user_i using the channel. If the payload of the channel caused by the data transmission of the access point 102 is less than the expected value of the payload of the channel of the user user_i, the higher the variance of the payload of the channel is, the higher the chance is for successful competition of the access point 102, reducing the probability of collision, reducing the number of packet retransmissions, thereby reducing the latency. Thus, the variance of the payload of the channel may be a latency-oriented feature.

In some other embodiments, the link information module 21 may calculate the total payload of the channel to generate a feature score. For each channel, the link information module 21 may add up the time of all users using the channel in the predetermined period t_total to generate the total time t_user_total, and divide the total time t_user_total by the predetermined period t_total to calculate the total payload of the channel (=t_user_total/t_total). The unit of the total payload of the channel may be a percentage of the total channel time used. For example, the predetermined time period t_total may be 1024 microseconds, the total time t_user_total of all users occupying the channel may be 512 microseconds, and the total payload of the channel may be 50% (=512/1024). The lower the total payload of the channel, the lower is the usage rate of the channel and the longer is the available time. Therefore, the competition among users will be reduced, resulting in less chance of collisions and retransmissions, thereby increasing the throughput of the channel and improving the efficiency and performance of the access point 102. The total payload of the channel may be a throughput-oriented feature.

The link information module 21 may generate a feature score according to the packet transmission information of each channel. In some embodiments, the link information module 21 may calculate the statistics of the number of collisions and the latency of the transmitted packets to generate the feature score. The statistics may be mean, variance, or other statistics. The feature score generated according to the statistics of the number of collisions and the latency of the transmitted packets may be a latency-oriented feature.

In some other embodiments, the link information module 21 may calculate the statistics of the MCS and the payload size of the transmitted/received packets to generate a feature score. The statistics may be mean, variance, or other statistics. The feature score generated according to the MCS and payload size of the transmitted/received packets may be a throughput-oriented feature.

In some other embodiments, the link information module 21 may weigh the wireless environment information and/or the packet transmission information to generate a new feature score.

A higher feature score of a channel indicates that the channel is more suitable for the packet type represented by the feature. For example, if feature 1 of channel 1 is related to the variance of the payload of the channel, the higher the feature score of feature 1 of channel 1 is, the more suitable the channel 1 is for latency-oriented data transmission.

The decision module 22 may receive the data transmission requirements of data transmission and M sets of feature scores of M channels, determine the MLO mode suitable for data transmission according to the data transmission requirements, select channels from M channels according to the MLO mode, and record the selected channels on the decision report and transmit the decision report. The control module 24 may set the transceiver module 26 according to the decision report and other constraints. The transceiver module 26 may perform data transmission. Other constraints may be the minimum frequency difference between the 2 channels. For example, if the decision report records that channel 36, channel 40, and channel 64 are the selected channels, however, the frequency bands of channel 36 and channel 40 are too close to each other and less than the minimum frequency difference between the two channels, the control module 24 would not use channel 36 and channel 40 to set the transceiver module 26, but would use channel 36 and channel 64, or use channel 40 and channel 64 to configure the transceiver module 26.

Data transmission requirements may include latency requirements, MCS requirements, bandwidth requirements, and payload size requirements. In some embodiments, the decision module 22 may find out the suitable MLO mode for data transmission according to the latency requirement, MCS requirement, bandwidth requirement and payload size requirement by means of table lookup. In some other embodiments, the decision module 22 may weigh a combination of the latency requirement, the MCS requirement, the bandwidth requirement, and the payload size requirement in the same or similar manner to generate corresponding feature scores and then generate a weighted MLO feature score, and determine the suitable MLO mode for the data transmission according to the weighted MLO feature score. The MLO feature score may be a latency score or a throughput score. For example, the decision module 22 may generate a latency score according to the latency requirement, and weigh the MCS requirement, bandwidth requirement, and payload size requirement to generate a throughput score. The MLO mode may be latency mode, throughput mode or load balancing mode. In the latency mode, data transmission has a low latency requirement, such as data transmission for online games, virtual reality (VR), augmented reality (AR) and video calls. In throughput mode, data transmission has high throughput requirements, such as data transmission for web browsing, cloud generating, high-resolution video streaming, and massive file sharing. In load balancing mode, data transmission does not have low latency requirements and high throughput requirements, such as text browsing. In some embodiments, the decision module 22 may determine the suitable MLO mode for data transmission according to the following pseudo code 1:

```
<Start of pseudo code 1>
input = 'data transmission requirement';
calculate 'latency score' and 'throughput score';
If (latency score > latency threshold), MLO mode = latency mode;
Else if (throughput score > throughput threshold), MLO mode =
throughput mode;
Else, MLO mode = load balancing mode;
<End of pseudo code 1>
```

Referring to the pseudo code 1, if (latency score>latency threshold) or (latency score>latency threshold & throughput score>throughput threshold), considering the latency packet is time-sensitive, the decision module 22 may attempt to enter the latency mode first. If (throughput score>throughput threshold), the decision module 22 may attempt to enter the throughput mode. If (latency score≤latency threshold & throughput score≤throughput threshold), the decision module 22 may attempt to enter the load balancing mode. In some embodiments, the latency threshold may be set according to the minimum latency requirement. For example, the latency threshold applied in a 1K video resolution may be lower than that in a 4K video resolution. In some embodiments, the throughput threshold may also be set according to the minimum throughput requirement. In the attempt of entering the MLO mode, the decision module 22 may select the required number of channels in the MLO mode and channels that meet the MLO criteria according to the M sets of the feature scores, and record the required number of channels in the decision report. If the required number of channels in the MLO mode cannot be satisfied, the decision module 22 may give up entering the MLO mode and enter the exit mode, and select a best qualified channel from the M channels for performing SLO. In some embodiments, the decision module 22 may select a suitable channel from the M channels to record in the decision report according to the following pseudo code 2:

```
<Start of pseudo code 2>
If (MLO mode = latency mode) { // attempt to enter latency mode,
Obtain the channel with a total latency feature score exceeding a threshold
of latency features;
If (number of suitable channels >= 2) { // enter successfully, MLO mode
=
latency mode
Record the suitable channels into the decision report; // The more latency-
oriented channels, the more favorable is for the channel competition
}
Else { // failed to enter, MLO mode = exit mode
Record the channel with the highest total score of latency features in the
decision report;
}
}
Else if (MLO mode = throughput mode) { // attempt to enter throughput
mode
Obtain channels with total throughput feature score exceeding a threshold
of throughput features;
If (number of suitable channels >= 2) { // enter successfully, MLO mode
=
throughput mode
Record 2 channels with the highest total throughput feature score in the
decision report;
}
Else { // failed to enter, MLO mode = exit mode
Record the channel with the highest total throughput feature score in the
decision report;
}
}
Else { // MLO mode = load balancing mode
Record 2 channels with the lowest total scores of latency features and
throughput features in the decision report;
}
<End of pseudo code 2>
```

Referring to pseudo code 2, if the decision module 22 attempts to enter the latency mode, then at least 2 channels are required to have total latency feature scores greater than the threshold of latency features. For example, the decision module 22 may use the weighted sum of the latency-oriented feature scores in each set of feature scores as the total latency feature score. If the total latency feature scores of at least 2 channels in the M channels are greater than the threshold of latency features, then the decision module 22 can enter the latency mode, and the decision module 22 would record the at least 2 channels in the decision report. In some embodiments, the decision module 22 may record all channels having total latency feature scores greater than the threshold of latency features in the decision report. When the station 121 receives time-sensitive data from an upper layer, the station 121 must gain access to a channel as soon as possible. Then in addition to considering the total latency feature scores of the channels, the number of channels must also be considered as well. Assuming that the loadings of channels are independent of each other, within a given time period, the probability of failure of the station 121 competing for the channel may be illustrated as Equation (1):

$$P(\text{failure in competition}) = P(\text{first link fails in competition}) * P(\text{second link fails in competition}) * \ldots * P(N\text{th link fails in competition}) \qquad \text{Equation (1)}$$

Where P (nth link fails in competition) represents the probability of the nth link fails in competition within a given time period, and n is a positive integer from 1 to N.

As shown in Equation (1), the more the links are selected (the larger N), or the smaller the latencies are on the selected links, the smaller the probability P (failure in competition) is, and the higher is the probability of the station 121 succeeding in the competition. Also, a channel with a greater variance in the channel payload has a higher probability of success in competing for the transmission opportunity, therefore, in the latency mode, the decision module 22 may record as many channels that meet the latency criterion as possible in the decision report. If the total latency feature scores of at least two channels of the M channels are greater than the threshold of latency features, then the decision module 22 enters the exit mode, and records the channel having the highest total latency feature score in the decision report.

If the decision module 22 attempts to enter the throughput mode, then 2 channels are required to have total throughput feature scores greater than the threshold of throughput features. For example, the decision module 22 may use the weighted sum of the plurality of throughput-oriented feature scores in each set of feature scores as the total throughput feature score. In the throughput mode, if there are at least 2 channels of the M channels having total throughput feature scores greater than the threshold of throughput features, then the decision module 22 can enter the throughput mode, and the decision module 22 will record the 2 channels with the total throughput feature scores greater than the threshold of throughput features in the decision report. In some embodiments, the 2 channels recorded in the decision report have two highest total throughput feature scores of the M channels. If there are less than two channels with total throughput feature scores greater than the threshold of throughput features, then the decision module 22 enters the exit mode, and records the channel having the highest total throughput feature score in the decision report.

If the decision module 22 attempts to enter the load balancing mode, then 2 channels are required. For example, the decision module 22 may use the weighted sum of the latency-oriented feature scores and the throughput-oriented feature scores in each set of feature scores as the total latency and throughput feature score. In the load balancing mode, since data transmission is neither latency-oriented nor throughput-oriented, the decision module 22 records the 2 channels having the lowest total latency and throughput feature scores in the decision report. The channels with high total latency feature scores and total throughput feature scores are reserved for the latency mode and the throughput mode respectively, achieving payload balance of the multi-link communication system 1. In some embodiments, the decision module 22 may also delete channels with higher total latency and throughput feature scores from the M channels, select the 2 channels having the highest total latency and throughput feature scores from the remaining channels, and record the two channels in the decision report, allowing other devices in the multi-link communication system 1 obtaining more abundant spectrum resources. Therefore, the load balancing mode would improve the performance of the high density network.

FIGS. 3A to 3E are flowcharts of a control method 300 of the station 121. The control method 300 includes Steps S304 to S384, wherein Steps S304 and S306 are configured to collect wireless environment information and packet transmission information of each channel; Steps S308 to S316 are configured to perform the latency mode; Steps S322 to S326 are configured to perform the throughput mode; Steps S342 and S324 are configured to perform the exit mode; Steps S362 and S364 are configured to perform the load balancing mode; and Steps S382 and S384 are configured to configure the transceiver module 26 and perform data transmission according to the decision report. Any reasonable step change or adjustment is within the scope of the present disclosure. The details of Steps S304 to S384 are described as follows:

Step S304: The link information module 21 collects wireless environment information and packet transmission information of each channel of the M channels supported by the multi-link device;

Step S306: The link information module 21 generates a set of feature scores of each channel according to wireless environment information and/or packet transmission information, and outputs M sets of feature scores of M channels;

Step S308: The decision module 22 receives data transmission requirements of data transmission and M sets of feature scores of M channels;

Step S310: The decision module 22 generates the latency scores and/or the throughput scores according to the data transmission requirements;

Step S312: The decision module 22 determines whether the latency score is greater than the latency threshold? If so, continue to Step S314; if not, continue to Step S322;

Step S314: The decision module 22 determines whether at least two of the M channels meet the latency criterion? If so, continue to Step S316; if not, continue to Step S342;

Step S316: The decision module 22 outputs a decision report, and the decision report records at least 2 channels that meet the latency criterion; continue to Step S382;

Step S322: The decision module 22 determines whether the throughput score is greater than the throughput threshold? If so, continue to Step S324; if not, continue to Step S362;

Step S324: The decision module 22 determines whether two channels of the M channels meet the throughput criterion? If so, continue to Step S326; if not, continue to Step S342;

Step S326: The decision module 22 outputs a decision report, and the decision report records 2 channels that meet the throughput criterion; continue to Step S382;

Step S342: The decision module 22 generates the total latency feature scores or the total throughput feature score of each channel;

Step S344: The decision module 22 outputs a decision report, and the decision report records 1 channel having the highest total latency feature score or total throughput feature score of the M channels; continue to Step S382;

Step S362: The decision module 22 generates the total latency and throughput feature scores in the set of feature scores of each channel;

Step S364: The decision module 22 outputs a decision report, and the decision report records 2 channels with the 2 lowest total latency and throughput feature scores in the M channels; continue to Step S382;

Step S382: The control module 24 sets the transceiver module 26 according to the decision report;

Step S384: The transceiver module 26 performs data transmission; the method 300 ends.

The details of Steps S302 to S384 have been explained in the preceding paragraphs, and will not repeated here for brevity.

The term "module" used in this specification may be a combination of software, firmware and/or hardware.

The multi-link device and the control method thereof in the embodiment of the present invention actively select the channels that meet the data transmission requirements in real time, enhancing the utilization of spectral and time resources, saving power due to reduced packet collisions and retransmissions, thereby improving the efficiency of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-link device comprising:
a link information module configured to collect wireless environment information and packet transmission information of each channel of M channels supported by the multi-link device, and generate a set of feature scores of the each channel according to the wireless environment information and/or the packet transmission information, and output M sets of feature scores of the M channels, wherein M is a positive integer greater than or equal to 2;
a decision module coupled to the link information module, and configured to receive a data transmission requirement of a data transmission and the M sets of feature scores of the M channels, generate a latency score according to the data transmission requirement, determine whether at least 2 channels of the M channels meet a latency criterion according to the M sets of feature score of the M channels if the latency score is greater than a latency threshold, and generate a decision report at least according to whether at least 2 channels of M channels meet the latency criterion;
a transceiver module configured to transmit the information; and
a control module coupled to the decision module and the transceiver module, and configured to configure the transceiver module according to the decision report.

2. The multi-link device of claim 1, wherein if at least 2 of the M channels meet the latency criterion, the decision report records the at least 2 channels meeting the latency criterion.

3. The multi-link device of claim 1, wherein:
the set of feature scores of the each channel comprises at least one latency feature score;
the decision module is further configured to generate a total latency feature score according to the at least one latency feature score; and
the latency criterion is that the total latency feature score is greater than a latency feature threshold.

4. The multi-link device of claim 3, wherein:
if at least 2 of the M channels do not meet the latency criterion, the decision report records 1 channel having the highest total latency feature score.

5. The multi-link device of claim 1, wherein:
the decision module is further configured to generate a throughput score according to the data transmission requirement, if the latency score is not greater than the latency threshold and the throughput score is greater than a throughput threshold, determine whether 2 of the M channels meet a throughput criterion according to the M sets of feature scores of the M channels, and output the decision report at least according to whether at least 2 of the M channels meet the throughput criterion.

6. The multi-link device of claim 5, wherein if at least 2 of the M channels meet the throughput criterion, the decision report includes the 2 channels meeting the throughput criterion.

7. The multi-link device of claim 5, wherein:
the set of feature scores of each channel comprises at least one throughput feature score;
the decision module is further configured to generate a total throughput feature score according to the at least one throughput feature score; and
the throughput criterion is that the total throughput feature score is greater than a threshold of throughput features.

8. The multi-link device of claim 7, wherein:
if at least 2 of the M channels do not meet the throughput criterion, the decision report includes 1 channel having a highest total throughput feature score.

9. The multi-link device of claim 5, wherein:
the set of feature scores of each channel includes a latency feature score and a throughput feature score; and
if the latency score is not greater than the latency threshold and the throughput score is not greater than the throughput threshold, the decision module is configured to further output the decision report, and the decision report includes 2 channels having first 2 lowest total scores.

10. The multi-link device of claim 1, wherein the data transmission requirement includes a latency requirement, a modulation and coding scheme (MCS) requirement, a bandwidth requirement and a payload size requirement.

11. A method for controlling a multi-link device, the multi-link device comprising a link information module, a decision module, a control module and a transceiver module, the method comprising:
the link information module collecting wireless environment information and packet transmission information of each channel of M channels supported by the multi-link device, wherein M is a positive integer greater than or equal to 2;
the link information module generating a set of feature scores of the each channel according to the wireless environment information and/or the packet transmission information;
the link information module outputting the M sets of feature scores of the M channels;
the decision module receiving a data transmission requirement of a data transmission and the M sets of feature scores of the M channels;
the decision module generating a latency score according to the data transmission requirement;
the decision module determining whether at least 2 of the M channels meet a latency criterion according to the M sets of feature scores of the M channels if the latency score is greater than a latency threshold;
the decision module outputting a decision report according to at least whether the at least 2 of the M channels meet the latency criterion;
the control module configuring the transceiver module according to the decision report; and
the transceiver module performing the data transmission.

12. The method of claim 11, wherein the decision module at least outputting the decision report according to whether the at least 2 of the M channels meet the latency criterion comprises:

if the at least 2 of the M channels meet the latency criterion, including at least 2 channels meeting the latency criterion in the decision report.

13. The method of claim 11, wherein:

the set of feature scores of the each channel comprises at least one latency feature score;

the method further comprises the decision module generating one total latency feature score according to the at least one latency feature score, wherein the latency criterion is that the total latency feature score is greater than a latency feature threshold.

14. The method of claim 12, wherein the decision module at least outputting the decision report according to whether the at least 2 of the M channels meet the latency criterion comprises:

if at least 2 of the M channels do not meet the latency criterion, including 1 channel having a highest total latency feature score in the decision report.

15. The method of claim 11, wherein the method further comprising:

the decision module generating a throughput score according to the data transmission requirement;

if the latency score is not greater than the latency threshold and the throughput score is greater than a throughput threshold, the decision module determining whether 2 of the M channels meet a throughput criterion according to the M sets of feature scores of the M channels; and the decision module outputting the decision report at least according to whether the at least 2 channels of the M channels meet the throughput criterion.

16. The method of claim 15, wherein the decision module outputting the decision report at least according to whether the at least 2 channels of the M channels meet the throughput criterion comprises:

if the at least 2 of the M channels meet the throughput criterion, including 2 channels meeting the throughput criterion in the decision report.

17. The method of claim 15, wherein:

the set of feature scores of the each channel comprises at least one throughput feature score;

the method further comprises the decision module generating a total throughput feature score according to the at least one throughput feature score; and the throughput criterion is that the total throughput feature score is greater than a threshold of throughput features.

18. The method of claim 16, wherein the decision module outputting the decision report at least according to whether the at least 2 channels of the M channels meet the throughput criterion comprises:

if at least 2 of the M channels do not meet the throughput criterion, including 1 channel having a highest total throughput feature score in the decision report.

19. The method of claim 14, wherein:

the set of feature scores of the each channel includes a latency feature score and a throughput feature score; and the method further comprises if the latency score is not greater than the latency threshold and the throughput score is not greater than the throughput threshold, the decision module generating a total score of the latency feature score and the throughput feature score in the set of feature scores of the each channel, and outputting the decision report, wherein the decision report includes 2 channels having first 2 lowest total scores of the M channels.

20. The method of claim 11, wherein the data transmission requirement comprises a latency requirement, a modulation and coding scheme (MCS) requirement, a bandwidth requirement and a payload size requirement.

* * * * *